(12) United States Patent
Bouska

(10) Patent No.: US 11,016,207 B2
(45) Date of Patent: *May 25, 2021

(54) SEISMIC SENSOR

(71) Applicant: BP Exploration Operating Company Limited, Middlesex (GB)

(72) Inventor: John Gerard Bouska, Calgary (CA)

(73) Assignee: BP Exploration Operating Company Limited, Middlesex (GB)

( * ) Notice: Subject to any disclaimer, the term of this patent is extended or adjusted under 35 U.S.C. 154(b) by 400 days.

This patent is subject to a terminal disclaimer.

(21) Appl. No.: 16/169,042

(22) Filed: Oct. 24, 2018

(65) Prior Publication Data

US 2019/0064376 A1 Feb. 28, 2019

Related U.S. Application Data

(63) Continuation of application No. 15/125,859, filed as application No. PCT/EP2015/055240 on Mar. 12, 2015, now Pat. No. 10,139,506.

(Continued)

(51) Int. Cl.
*G01V 1/16* (2006.01)
*G01H 11/08* (2006.01)
(Continued)

(52) U.S. Cl.
CPC .............. *G01V 1/164* (2013.01); *G01H 11/08* (2013.01); *G01P 15/09* (2013.01);
(Continued)

(58) Field of Classification Search
None
See application file for complete search history.

(56) References Cited

U.S. PATENT DOCUMENTS

| 3,911,388 A | 10/1975 | Crump et al. |
| 4,188,612 A | 2/1980 | Kerr |
(Continued)

FOREIGN PATENT DOCUMENTS

| AT | 383220 B | 6/1987 |
| EP | 0292349 A1 | 11/1988 |
(Continued)

OTHER PUBLICATIONS

Russian Office Action dated May 14, 2018, for Russian Application No. 2016140387 (3 p.).

(Continued)

*Primary Examiner* — Hovhannes Baghdasaryan
(74) *Attorney, Agent, or Firm* — Conley Rose, P.C.

(57) ABSTRACT

A seismic survey apparatus includes a body having a longitudinal axis, a first end, a second end opposite the first end, and an inner cavity positioned between the first end and the second end. In addition, the seismic survey apparatus includes a proof mass moveably disposed in the inner cavity of the body. The proof mass is configured to move axially relative to the body. Further, the seismic survey apparatus includes a first sensor disposed in the inner cavity. The first sensor comprises a first piezoelectric element configured to detect the axial movement of the proof mass relative to the body. Still further, the seismic survey apparatus includes electronic circuitry coupled to the first piezoelectric element. The electronic circuitry is configured to receive and process an output of the first piezoelectric element. The proof mass comprises a power supply configured to provide electrical power to the electronic circuitry.

30 Claims, 4 Drawing Sheets

Related U.S. Application Data

(60) Provisional application No. 61/953,086, filed on Mar. 14, 2014.

(51) Int. Cl.
*G01P 15/09* (2006.01)
*G01V 1/18* (2006.01)

(52) U.S. Cl.
CPC .......... *G01P 15/0922* (2013.01); *G01V 1/181* (2013.01); *G01V 2210/1423* (2013.01); *G01V 2210/1425* (2013.01); *G01V 2210/1427* (2013.01)

(56) References Cited

U.S. PATENT DOCUMENTS

| | | | |
|---|---|---|---|
| 4,295,542 A | 10/1981 | Reeves et al. | |
| 4,315,433 A | 2/1982 | Edelman et al. | |
| 4,839,872 A | 6/1989 | Gragnolati et al. | |
| 6,552,961 B1 | 4/2003 | Bremner et al. | |
| 7,284,431 B1 | 10/2007 | Barger | |
| 2010/0201516 A1 | 8/2010 | Gelvin et al. | |

FOREIGN PATENT DOCUMENTS

| | | |
|---|---|---|
| RU | 2084003 C1 | 7/1997 |
| SU | 995044 A1 | 2/1983 |
| SU | 1023241 A1 | 6/1983 |
| WO | 00/12978 A1 | 3/2000 |
| WO | 2014/022705 A1 | 2/2014 |

OTHER PUBLICATIONS

PCT/EP2015/055240 International Search Report and Written Opinion dated Jun. 11, 2015 (11 p.).
Office Action dated Feb. 20, 2018, for U.S. Appl. No. 15/125,859 (9 p.).
Response to Office Action dated Feb. 20, 2018, for U.S. Appl. No. 15/125,859; Response filed Jun. 20, 2018 (11 p.).
Notice of Allowance dated Jul. 25, 2018, for U.S. Appl. No. 15/125,859 (8 p.).

SEISMIC SENSOR

CROSS-REFERENCE TO RELATED APPLICATIONS

This application is a continuation under 35 U.S.C. § 120 of U.S. application Ser. No. 15/125,859 filed Sep. 13, 2016 and entitled, "Seismic Sensor," which is a 35 U.S.C. § 371 national stage application of PCT/EP2015/055240 filed Mar. 12, 2015 and entitled "Seismic Sensor," which claims priority to U.S. Provisional Application No. 61/953,086 filed Mar. 14, 2014 and entitled "Seismic Sensor," each of which is hereby incorporated herein by reference in its entirety for all purposes.

STATEMENT REGARDING FEDERALLY SPONSORED RESEARCH OR DEVELOPMENT

Not applicable.

BACKGROUND

The present invention relates to an apparatus for use in seismic surveying.

Seismic surveying, or reflection seismology, is used to map the Earth's subsurface. A controlled seismic source provides a low frequency seismic wave which travels through the subsurface of the Earth. At interfaces between dissimilar rock layers, the seismic wave is partially reflected. The reflected waves return to the surface where they are detected by one or more of seismic sensors. Ground vibration detected at the earth surface can have a very wide dynamic range, with particle displacement distances ranging from centimetres to angstroms. Data recorded by the sensors is analysed to reveal the structure and composition of the subsurface.

Seismic sensors (also known as seismometers or geophones) typically comprise an electric coil of wire immersed in a strong magnetic field. These electromagnetic sensors can be constructed as either moving magnet or moving coil types, with the latter exclusively favoured for seismic exploration. In the moving coil version, the magnet is fixed to the case, which is then firmly planted in the earth, such that the case and magnet move in unison with ground displacements. The moving electrical coil is immersed in the magnetic field gap of a fixed magnet and the coil is loosely coupled to the geophone case by soft springs in such a way that the coil can only travel along a single axis. As the coil moves along this axis, relative to the fixed magnet, it will progressively cut through lines of magnetic flux, and generate a voltage and current at the electrical terminals of the coil, in proportion to the velocity of ground displacement. In the moving coil type, the coil forms the proof or reaction mass.

The coil and spring arrangement will have a resonant frequency dependant on the mass of the coil and the compliance of the springs. At frequencies well below resonance, the coil and magnet move in unison so that sensitivity is low and voltage or current output is small. As the frequency of vibrations increase upwards to and beyond the resonant frequency of the geophone the sensitivity and output increase, peak and flatten respectively. Typically the resonant frequency of geophones falls in the 10 to 30 Hz range, preference given to the low end. Low frequency resonance requires high spring compliance. This subsequently requires soft springs which in turn mandate precise design and construction of the sensor to achieve the required sensitivity, robustness, linearity and immunity to off axis distortion, necessary for seismic acquisition. The design tradeoffs among field strength, magnet size/weight, coil geometry and spring compliance are critical to design and construction of a geophone which has sufficient sensitivity, voltage-current output, linearity and robustness to simultaneously measure both the large and small surface vibrations described above.

A further type of geophone in use for seismic surveying uses capacitance to generate the electrical signal. These are typically constructed as Microelectromechanical systems (MEMS) using micro machined silicon with metal plating applied to facing components on either side of a small plated and spring loaded proof mass. These MEMS sensors may have the advantage of small size and weight compared to a moving coil geophone. The movement of the MEMS proof mass relative to the outer fixed plates creates variable capacitance which can be detected as a vibrations signal proportional to the acceleration of the sensor displacement. The springs are formed from regions of thin cut silicon, allowing a small linear displacement, and resonant frequencies above 1 kHz. The small capacitive surface area, high resonant frequency and restricted limit of linear travel mean that sensitivity will be quite low compared to a moving coil geophone. To counter this specialized electronics is used to hold the MEMS geophone in force feedback state. This required additional electronic circuitry requires space and power and partially defeats the MEMS advantages of size and weight compared to the passive moving coil geophone.

The term proof mass may also be known as a reaction mass or seismic mass and is generally known in the art to refer to a mass in a seismic sensor which moves as a consequence of the earth moving during a seismic acquisition survey.

BRIEF SUMMARY OF THE DISCLOSURE

The following describes a seismic sensor suitable for use in seismic surveying.

In accordance with at least one embodiment apparatus and systems are provided for supporting or implementing functionality to perform seismic surveying.

This is achieved by a combination of features recited in each independent claim. Accordingly, dependent claims prescribe further detailed implementations of various embodiments.

According to an aspect of the invention, there is provided a seismic survey apparatus comprising: a body; a proof mass; at least one sensor arranged to detect movement of the proof mass relative to the body; electronic circuitry connected to the at least one sensor, the electronic circuitry being configured to receive and process an output of the sensor; and a power supply arranged to provide electrical power to the electronic circuitry, wherein the power supply is an integral part of the proof mass.

Known devices used for seismic surveying are typically large, expensive and have a relatively high weight. Since such apparatuses need to be transported to the location to be surveyed, their size and weight increases the time and effort required to perform a survey. The Geophone or MEMS sensor of such apparatuses enable ground particle displacement, caused by propagating seismic waves to be converted into a proportional voltage signal and subsequently recorded as a function of time. The ground particle displacement causes the geophone or MEMS body which is fixed to the ground, to move in unison with the amplitude of the propagating seismic wave at that position in space. The inertia of either the Geophone coil, or the MEMS silicon proof mass causes it to remain relatively static, such that the body then moves in relation to the coil or proof mass. This relative movement of the body and coil or proof mass is converted to a proportional voltage waveform, enabling the seismic wave to be recorded. To enable effective operation of the device, the sensitivity must be adequate to respond to minute ground movement with low distortion. This requires a strong, heavy, magnet and expensively wound coil in geophone sensors or alternately expensive precision micromachined componentry and power consuming electronics in MEMS sensors.

By providing an apparatus for use in seismic surveying where the proof mass comprises a power supply, so arranged to maximize sensitivity, linearity and robustness, the apparatus is able to save both size and weight in comparison to known devices where the sensor and power supply are separate entities. This in turn makes seismic surveying more efficient.

The power supply may comprise a battery. The sensor may comprise one or more piezoelectric elements arranged to detect the movement of the proof mass.

According to another aspect, there is provided a seismic survey apparatus comprising: a body; a proof mass movably located in a cavity of the body; and two sensors, each sensor comprising a planar piezoelectric element; wherein the piezoelectric elements are arranged on opposite sides of the proof mass to detect movement of the proof mass relative to the body and wherein the body is arranged to constrain said movement of the proof mass to reciprocation in a first direction between the piezoelectric elements.

In this aspect, the apparatus may also comprise electronic circuitry connected to the sensors, the electronic circuitry being configured to receive and process an output of the sensors; and a power supply arranged to provide electrical power to the electronic circuitry, wherein the power supply is an integral part of the proof mass. The power supply may comprise a battery.

Known devices used for seismic surveying typically use complex sensors such as a moving coil within a magnetic field. The inventor has recognized that simpler lighter and more cost efficient apparatus can be constructed using piezoelectric elements. While piezoelectric pressure transducers are widely used in offshore marine surveys, the use of piezoelectric elements for onshore sensors is deemed inappropriate in the art as the accuracy of piezoelectric elements is deemed to be insufficient. However, the cost, size and weight gains afforded by having the proof mass comprising the power supply enable an increased number of such apparatuses to be deployed. The larger number of apparatuses, in comparison to historical and current practice, enable the accuracy of the system as a whole to be maintained and enhanced, despite any reduction of the accuracy of a single apparatus.

Various features will now be described which can be used in combination with either of the above-described aspects.

The one or more piezoelectric elements may comprise rigid ceramic. The rigid ceramic may comprise lead zirconate titanate (PZT).

The sensor may comprise a substrate on which the piezoelectric element is supported. The substrate may comprise beryllium copper.

The one or more piezoelectric elements may be pre-stressed. In other words, the piezoelectric element is arranged in the apparatus such that, even in the absence of movement of the proof mass, the piezoelectric element is concave.

The electronic circuitry may be arranged, at least, to amplify and/or digitally sample the output of the sensor whereby to process the output of the sensor.

The proof mass may be movably coupled to the body, and the apparatus may be arranged to constrain the movement of the proof mass relative to the body to reciprocation in a first direction. The at least one sensor may be arranged to detect said reciprocation of the proof mass in the first direction whereby to detect movement of the proof mass relative to the body.

This restriction of the movement of the proof mass can be a restriction to movement towards and away from the piezoelectric elements. Accordingly, the reciprocation of the proof mass between the piezoelectric elements can be generally perpendicular to the plane of the piezoelectric elements.

The piezoelectric elements are arranged such that their planes are generally parallel.

By constraining the movement of the proof mass relative to the body to reciprocation in a first direction, the apparatus is able to selectively detect the component direction of particle displacement. For example, three such piezoelectric sensors can be arranged with sensing axis in mutually orthogonal directions matching the Cartesian coordinates X, Y and Z. In this configuration, each individual sensor is insensitive, or blind to movement that is not aligned with its particular axis of sensing. This arrangement allows three sensors to be used to capture the full spatial vector component comprising the propagating elastic wave field.

The proof mass may be movably located in a cavity of the body. The proof mass may comprise an elongated member having a long axis, the body may comprise an elongated sleeve having a long axis, and the long axis of the elongated member may be located co-axially with the long axis of the elongated sleeve.

The first direction may be aligned with the co-axial long axes of the elongated member and the elongated sleeve. At least a part of a cross section of the elongated sleeve perpendicular to its long axis may conform to at least a part of a cross section of the elongated member perpendicular to its long axis, whereby to constrain the movement of the proof mass relative to the body to reciprocation in the first direction.

To enable efficient packaging of the proof mass, of which the power supply is integral, within the body, the proof mass may comprise an elongated member, which moves within a sleeve. The elongated member, for example, may be formed of a cylindrical battery with, or without, end pieces or a casing. The sleeve may be arranged with a diameter conforming to the battery and optionally any end pieces or casing. Therefore, with the minimal of additional material, the proof mass may be constrained in movement (enabling effective operation) whilst having the power supply (battery) integral to it.

The sleeve may comprise a cap assembly at each end arranged to retain the elongated member within the sleeve. At least one of the cap assemblies may comprise the at least one sensor.

The battery, or terminal, or end cap, or spacing member, may be fixed, adhered, or otherwise mechanically attached to the sensor, for example to the substrate or ceramic of the sensor, by adhesive, welding, soldering, through hole screw or any other suitable mechanical fastening such that the proof mass can alternately stress, push or pull the piezoelectric and substrate in both the forward and reverse directions, to cause both positive and negative polarity electric voltage or current signals.

The cap assemblies may comprise concave surfaces contacting the elongated member. The concave surfaces may together be arranged to exert a clamping force upon the elongated member whereby to constrain the movement of the elongated member, relative to the body, to reciprocation in the first direction. The elongated member may comprise adjustable elements arranged to enable a length of the elongated member along the long axis to be altered. The cap assemblies may be arranged whereby to enable a distance between the concave surfaces of the cap assemblies to be altered.

The sleeve may be capped to maintain the elongated member forming the proof mass within the sleeve. In addition, the cap assemblies may be arranged to clamp the elongated member so that it cannot move laterally within the sleeve (i.e. towards the side walls of the sleeve in a direction perpendicular to the long axis of the elongated member). This ensures that the movement of the elongated member is constrained. In addition, the elongated member, the sleeve and/or the cap assemblies may be arranged to be adjustable to ensure that the surfaces contact or are mechanically fixed to the elongated member.

Each cap assembly may comprise a flattened member arranged to contact the elongated member on a first surface of the flattened member, and a retaining member arranged to exert a clamping force on a perimeter of a second surface of the flattened member, the second surface facing the first surface. In embodiments, the retaining member may be integral to the cap assembly.

The concavity of the first surface may be caused by flexing of the flattened member resulting from the clamping force and an opposing force from contact of the elongated member with the first surface.

In embodiments, the apparatus may be constructed such that a flattened member is forced towards the elongated member via a clamping force on the perimeter thereof. This may cause the flattened member to flex, causing the concavity of the surface of the flattened member. This serves to effectively hold the elongated member in place, while enabling movement of the elongated member.

At least one of the flattened members may comprise the at least one sensor. At least one of the flattened members may comprise at least one piezoelectric element. The concavity of the flattened member may cause the piezoelectric element to be pre-stressed.

At least 75% of the proof mass by weight and/or by volume may be provided by the power supply.

The body may be constructed from material selected to have a density which is comparable to that of the ground in which it is intended to be used.

The apparatus of any one of the preceding claims, wherein the body is provided with a protrusion to engage the proof mass so as to limit movement of the proof mass, for example to limit movement of the proof mass in the first direction. This can prevent the proof mass pushing the piezoelectric element so far that it damages the piezoelectric element, for example in the event the apparatus is dropped.

According to a further exemplary embodiment, there is provided apparatus for use in seismic surveying, the apparatus comprising: a body; a proof mass; at least one sensor arranged to detect movement of the proof mass relative to the body; electronic circuitry connected to the at least one sensor, the electronic circuitry being configured to receive and process an output of the sensor; and a power supply arranged to provide electrical power to the electronic circuitry, wherein the power supply is an integral part of the proof mass.

BRIEF DESCRIPTION OF THE DRAWINGS

Further features and advantages will become apparent from the following description of preferred embodiments, given by way of example only, which is made with reference to the accompanying drawings.

Systems, apparatuses and methods will now be described as embodiments, by way of example only, with reference to the accompanying figures in which.

DETAILED DESCRIPTION

Figure 1:
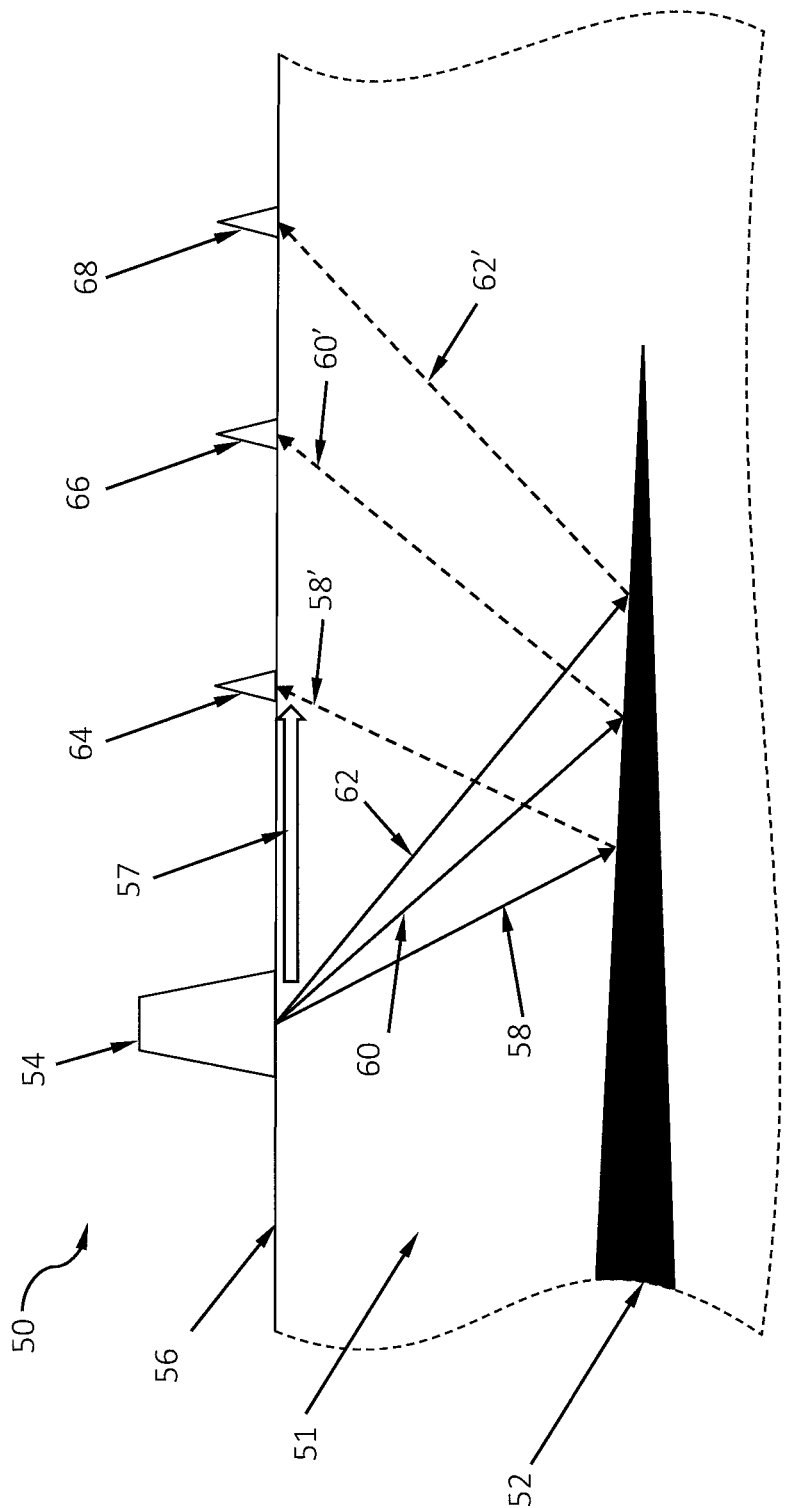
FIG. 1 shows a seismic sensing system.

Several parts and components of the invention appear in more than one Figure; for the sake of clarity the same reference numeral will be used to refer to the same part and A brief description of seismic sensing will first be described with reference to FIG. 1, followed by a description of a seismic sensor with reference to FIGS. 2, 3 and 4.

FIG. 1 shows a simplified representation of a seismic surveying system 50 surveying the subsurface of the earth 51. The subsurface 51 will, for the purposes of this illustration be assumed to have a relatively uniform composition, except for layer 52. This layer may, for example, be a different type of rock to the rest of the subsurface 51, and therefore be differing in e.g. density and/or elastic velocity to the rest of the subsurface 51.

A seismic source 54 is located on the surface 56 of the earth. The seismic source 54 creates controlled seismic waves for propagation through the subsurface 51. Known examples of seismic sources include but are not limited to; explosives, vibroseis trucks and accelerated weight drop systems also known as thumper trucks. For example, a thumper truck may strike the surface 56 of the earth with a weight or "hammer" creating a shock which propagates through the subsurface 51 as seismic waves. These seismic waves are represented by arrows 58, 60 and 62 and propagate downwards through the subsurface from the seismic source 54

The seismic waves are then reflected, at least partially, from the surface of the layer 52. This is caused by the density and/or elastic velocity differential between the layer 52 and the rest of the subsurface 51. The reflected seismic waves 58', 60' and 62' then propagate upwards from the layer 52 to the surface 56. At the surface 56, the reflected seismic waves 58', 60' and 62' are detected by seismic sensors 64, 66 and 68.

The seismic source 54 may also excite high amplitude surface interface waves 57 which travel along the surface 56 with slow velocity, and are detected concurrently with the deeper returning reflections 58', 60' and 62' which are much lower in amplitude due to cumulative effects of energy loss during propagation, such as: geometrical spreading of the wave front, interface transmission loss, weak reflection coefficient and travel path absorption. The cumulative effect of these losses may amount to 75 dB, and in cases more than 100 dB, in amplitude difference between various waveforms recorded by sensors 64, 66 and 68

Based on this detection of waves, the sensors may store, and/or transmit, data indicative of the detected seismic wave. This data can then be analysed to determine information about the composition of the subsurface 51—for example the location of layer 52.

The above describes a known seismic surveying system which puts the purpose of the seismic sensors into context. It will be appreciated that the above is only an example, and more complex subsurface compositions (i.e. other than single layer 52) will likely be present in the subsurface. Consequently, the reflection pattern of waves may be substantially more complex that that illustrated. For example, a part of a downward propagating seismic wave may not be reflected by the interface, and thereby travel through the layer 52. This wave my subsequently be reflected off a lower surface of the layer 52, meaning that multiple reflections may be received by any given seismic sensor.

The above described principle is not limited to surface based seismic sensing, and may be applied to marine seismic surveying. In this case, the subsurface 51 is covered by a layer of water. The seismic sensors 64, 66 and 68 may be provided on the seabed, or alternatively on or within the water. Alternative seismic sources 54 may be provided for marine seismic surveying, such as air guns and plasma sound sources.

An apparatus 100 for use in a seismic sensing system 50 (such as described above) will now be described with reference to FIGS. 2, 3 and 4. FIG. 2 shows an outer surface of the apparatus 100. FIG. 3 shows the same apparatus 100 viewed in cross section along line C-C shown in FIG. 2. FIG. 4 shows a close up view of one end of the cross section of the apparatus 100.

Figure 2:
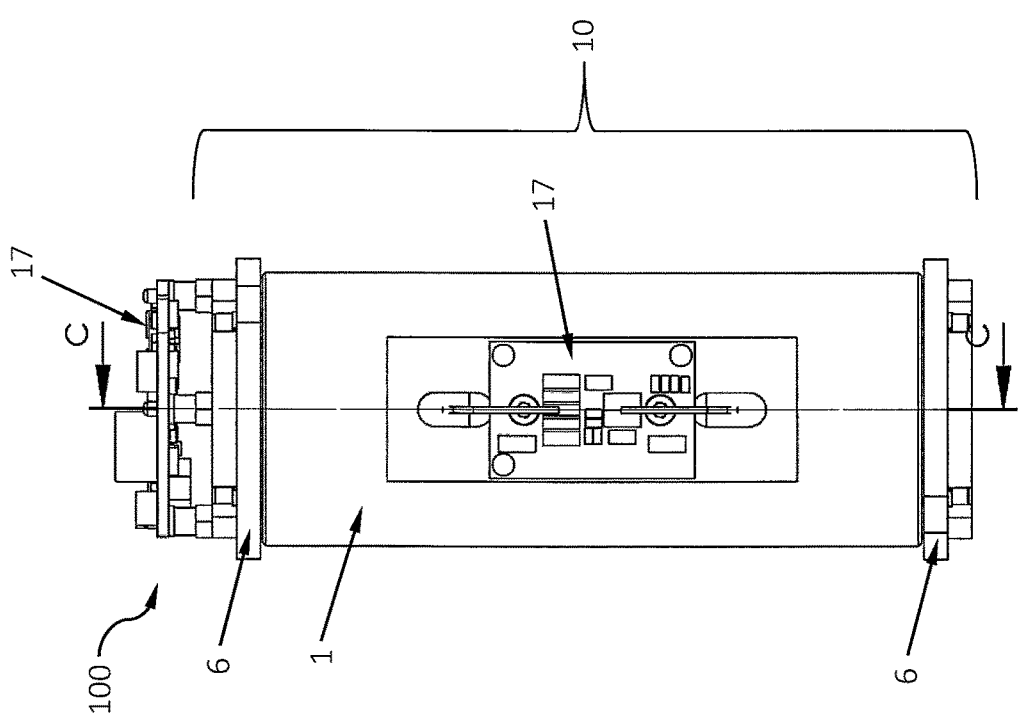
FIG. 2 shows an overview of an apparatus according to an embodiment for use in seismic surveying.

FIG. 2 shows the apparatus 100 in overview. The apparatus 100 comprises a body 10, which in this example comprises a sleeve 1 with end cap assemblies 6 located at the ends of the sleeve 1. A proof mass and at least one sensor arranged to detect movement of the proof mass relative to the body (not shown, described below) are provided within the body. The apparatus 100 comprises electronic circuitry 17 (shown both on the top and on the side of the body). This electronic circuitry is connected to the sensor, and is arranged to process the output of the at least one sensor, for example by amplifying, digitally sampling, transmitting and/or storing the output of the sensor. It will be appreciated that the electronic circuitry 17 may alternatively be located within the body, or in a unit connected to the body via wires (not shown).

Figure 3:
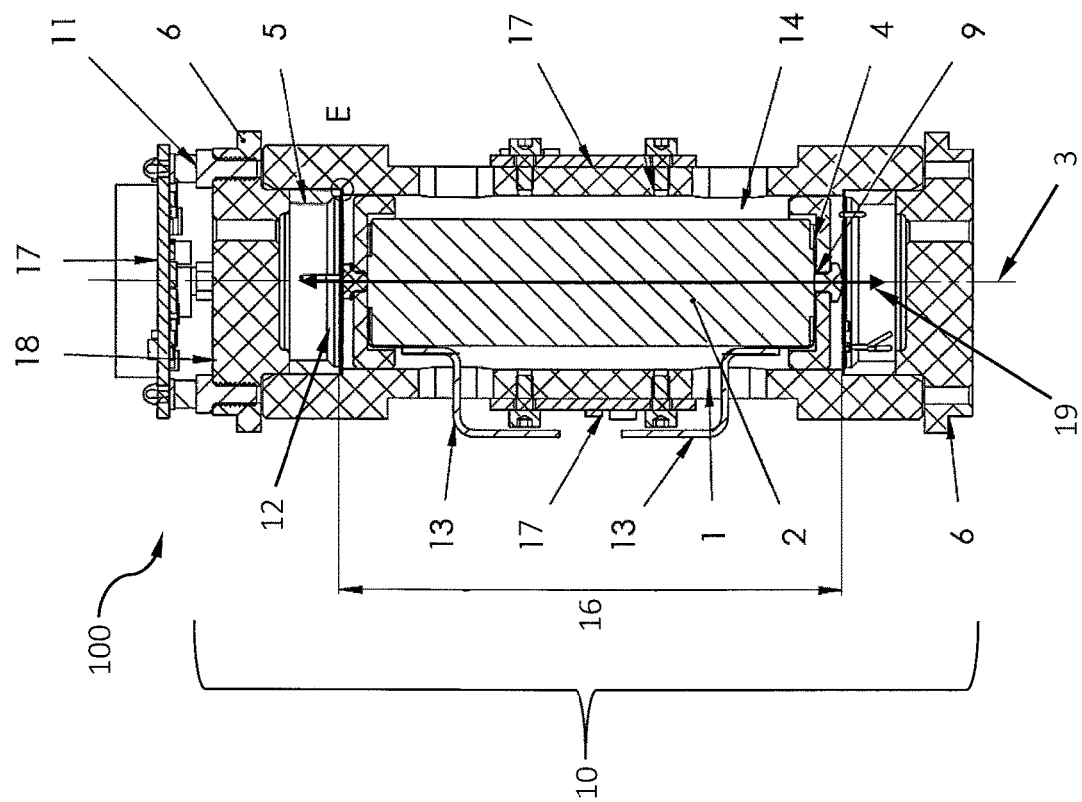
FIG. 3 shows a cross section of the same apparatus.

FIG. 3 shows the apparatus 100 of FIG. 2 taken in cross section along line C-C. The sleeve 1 is shown, with the end cap assemblies 6 located at each end. The electronic circuitry 17, mounted to the body, is also shown. Within the sleeve 1 is proof mass 14. In this embodiment it will be assumed that both the sleeve 1 and proof mass 14 are elongated cylinders (the sleeve 1 being a hollow cylinder), with long axis of the elongated proof mass 14 located co-axially with the long axis of the elongated sleeve 1. The direction of these long axes is marked by line 3 and will be referred to henceforth as the first direction 3.

The proof mass 14 is therefore movably coupled to, and located within, the body 10 of the apparatus. The apparatus, by mechanisms which will be described in more detail below, may constrain the movement of the proof mass 14 relative to the body 10 to reciprocation in the first direction 3, shown by double ended arrow 19. That is, the proof mass 14 may be able to move, at least to a limited extent, back and forth in the first direction 3, but may be restricted in moving in a direction perpendicular to the first direction 3.

The proof mass 14 comprises a power supply, e.g. one or more batteries, 2 which provide electrical power to the apparatus, and in particular to the electronic circuitry 17 via wires 13. In addition, in one embodiment, the proof mass 14 comprises adjustable elements 4 and 9, represented by proof mass end pieces 4 and adjustment screws 9. The adjustable elements 4 and 9 enable the length of the proof mass 14 along its long axis to be altered. The overall length of the proof mass is represented by arrow 16. The adjustable elements 4 and 9 may be used to thereby compensate for any differences or non-standardization between different batteries 2.

It will be observed that the majority of the proof mass 14 is formed by the battery 2. In other words, the battery 2 is integral to the proof mass 14. This may be taken to indicate that a substantial portion of the mass, volume and/or structure of the proof mass 14 is provided by the battery. For example at least 75% of the proof mass by weight and/or by volume may be provided by the battery 2.

End cap assemblies 6 are located at each end of the sleeve 1, and close the sleeve to retain the proof mass 14 within the body of the apparatus 100. The end cap assemblies 6 also comprise at least one sensor arranged to detect movement of the proof mass relative to the sleeve 1 in the first direction 3. These end cap assemblies 6 will be described in more detail in FIG. 4; nevertheless, in FIG. 3 are shown an end cap assembly body 18, attached to the sleeve via one or more screws 11, and a retaining member 5 retaining a flattened member 12.

Figure 4:
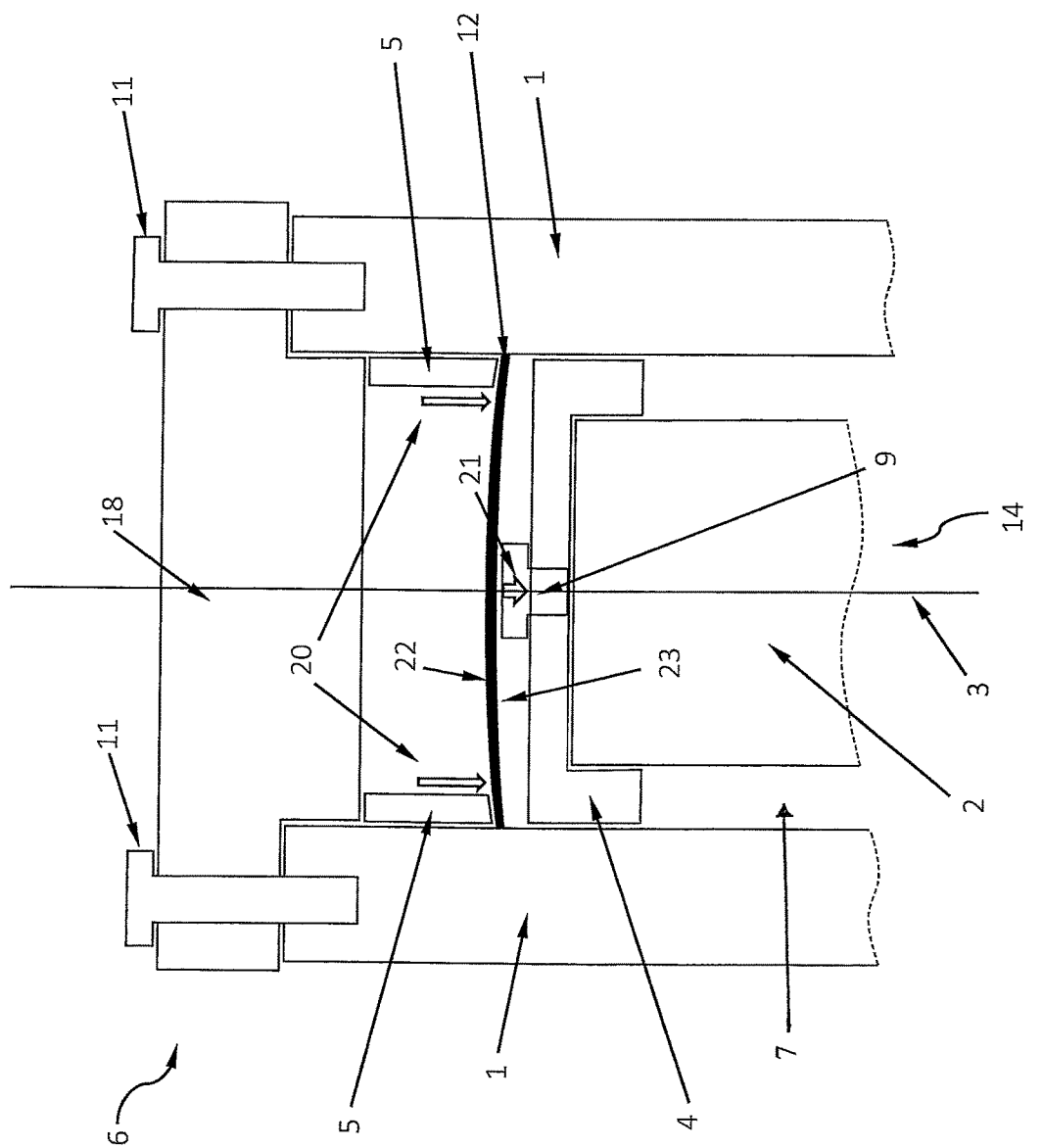
FIG. 4 shows a detailed view of one end of the cross section of FIG. 3.

FIG. 4 shows an end cap assembly 6 in more detail. It will be appreciated that, at least in the present embodiments, the two end cap assemblies are similar, and therefore the description of one is applicable to both.

As described above, the end cap assembly 6 closes the end of the sleeve 1 to retain the proof mass 14 within the body of the apparatus. The proof mass 14 comprises a battery 2, and adjustable elements 4 and 9. The end cap assembly 6 comprises an end cap body 18, retaining member 5 and a flattened member 12.

The end cap body 18 is fixed to the end of the sleeve 1. This may be done by retaining screws 11 as shown. Alternatively, the end cap body 18 may be, for example, affixed to the sleeve using adhesive, heat welding, acoustic welding, plastic overmoulding, a push or snap fit, or may be threaded to be screwed into the sleeve.

The end cap body 18 is abutted by a retaining member 5 within the sleeve. The retaining member may be a separate element, as shown. However, in other embodiments the end cap body 18 and the retaining member 5 may be a single piece. In this embodiment, the sleeve 1 is cylindrical, and as such the retaining member 5 may be in the form of a ring, conforming to the inner surface of the cylindrical sleeve 1. The retaining member 5 exerts a retaining force, represented by arrows 20, upon the perimeter of the upper surface 22 of flattened member 12. In this embodiment, it will be appreciated that the flattened member 12 is a disk.

Contacting the lower surface 23 of the flattened member 12 is the proof mass 14. In this embodiment, it is the adjustment screw 9 of the adjustable elements which contacts the surface 23. The flattened member 12 thereby exerts a clamping force 21, equal to the retaining force 20, onto the proof mass 14. The proof mass 14 may contact the surface 23 of the flattened member at or near the centre of the flattened member 12—in other words, the contact point is closer to the centre of the flattened member 12 than it is to the perimeter.

The flattened member 12 is flexible in the first direction 3, by virtue of being relatively thin in the first direction in comparison to directions perpendicular to the first direction 3. Therefore the proof mass 14 is allowed to reciprocate in the first direction 3 while being clamped by the flattened member 12.

The flattened member 12 may comprise one or more sensors which measure the deflection of the flattened member 12. For example, the flattened member may comprise one or more piezoelectric elements 12a which detect the movement of the proof mass 14 relative to the sleeve 1. As is known in the art, a piezoelectric element, upon being deflected, generates a voltage or charge output proportional to the deflection or strain. This voltage or charge output can be detected, for example by electronic circuitry 17, to generate a signal indicative of the movement of the proof mass 14.

The one or more piezoelectric elements may comprise rigid ceramic, such as lead zirconate titanate (PZT). The one or more piezoelectric elements may be combined with (e.g. bonded to or sandwiched by) support material or substrate, which provides the flattened member 12 with sufficient elastic compliance and strength to clamp the proof mass 14 without fracturing, and which has a bending stiffness which is greater than that of the rigid ceramic piezoelectric element. The support material may be electrically conductive. The flattened member 12 may thus comprise a disk shaped piezoelectric sensor.

FIG. 4 shows the surface 23 of the flattened member 12 which contacts the proof mass 14 being concave towards the proof mass. This may be by design (i.e. the flattened member 12 is constructed with a suitable shape) however this may also be caused by the forces on the flattened member 12. In other words, the concavity of the surface 23 may be caused by flexing of the flattened member 12 resulting from the clamping force 20 and an opposing force from contact of the proof mass 14 with the surface of the flattened member 12 (which as noted above is provided substantially in the centre of the flattened member 12). To enable this pre-load stress, the apparatus may be configured such that the retaining members 5 of the end cap assemblies 6 force respective flattened members 12 inwards to a sufficient extent that their curvature is unavoidable (due to the non-compressibility of the proof mass 14). An appropriate pre-load stressing force, and therefore curvature, can be achieved by varying the length of the proof mass 14 in the first direction 3 using the adjustment screw 9.

This has certain effects. First, any piezoelectric sensor elements can be pre-stressed. This gives a more predictable response by the piezoelectric element to any flexing of the flattened member 12, and thereby improves the accuracy of the sensing. Furthermore, a concave surface may provide an inwardly radial force on the proof mass 14. This may serve to centre the proof mass within the sleeve 1, thereby ensuring minimal contact (and thus friction) between the proof mass 14 and the sleeve 1. Also, if a piezoelectric element is pre-stressed, then movement of the proof mass away from the piezoelectric element is sensed as the element moves towards a more "at rest" position. In the absence of pre-stressing, this movement away from the piezoelectric element may not be detected.

Consequently, the end cap assembly 6, by virtue of the flattened member 12 held by the retaining member 5 and contacting the proof mass 14, serves two purposes: first to clamp the proof mass 14, coupling it to the sensor body (sleeve 1 and end cap assemblies 6) and restricting movement of the proof mass relative to the body to reciprocation in the first direction 3; and secondly to sense any movement of the proof mass relative to the body in that first direction 3.

It has been found that a height to diameter ratio for the proof mass 14 of between 2:1 and 5:1 is advantageous for apparatuses for use in seismic surveying for the oil and gas industry. Where the body conforms to the shape and size of the proof mass, such proportions allow an appropriate weight for the proof mass whilst affording relatively easy deployment of the apparatuses in the ground.

In use, many of the apparatus 100 are placed on or in the surface of the earth. Each such apparatus may, for example, be attached to a spike which is pushed into the earth. Alternatively, the entire apparatus may be buried, or placed at depth in a borehole. Each apparatus 100 may be placed with the first direction vertical. The arrival of a compressional seismic wave causes the body of the apparatuses 100 to move with a strong vertical component. The inertia of the proof mass 14 causes it to resist moving with the displacement of the body, and consequently the proof mass 14 will move relative to the body. This movement causes the flattened members 12 to be deflected. It can be seen that movement of the proof mass relative to the body in the first direction causes the flattened member to increase or decrease the degree of deflection relative to the degree of deflected of the flattened member when it is "at rest" i.e. when the proof mass is not moving relative to the body. By virtue of the piezoelectric sensors within the flattened members 12, this deflection is detected, and may be sampled, transmitted and/or stored by the electronic circuitry 17. The sampled data may then be analysed to determine the composition of the subsurface 51.

Consequently, the above described apparatus is able to detect seismic waves, while maintaining a compact and lightweight body.

Figure 6:
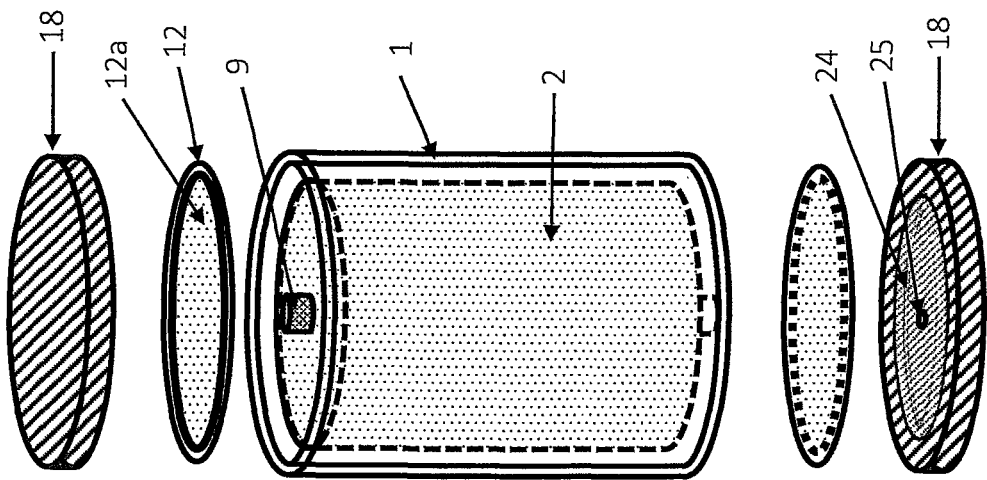
FIG. 6 shows the apparatus of FIG. 5 in a three dimensional exploded view.
Figure 5:
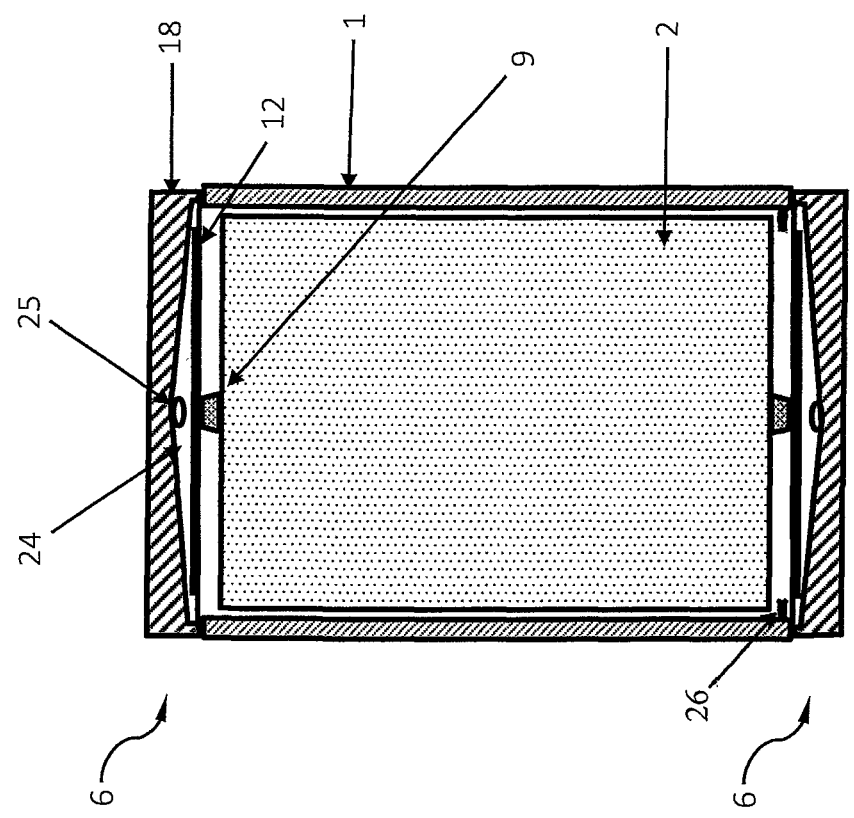
FIG. 5 shows a cross sectional view of a further embodiment of an apparatus for use in seismic surveying.

FIGS. 5 and 6 show a further embodiment of an apparatus for use in seismic surveying. This apparatus shares many features in common with the apparatus described above, similar features will be provided with the same reference numbers. It will be appreciated that features of this further embodiment may be combined with those of the embodiment described above.

As such, the apparatus comprise a sleeve 1 with end cap assemblies 6 at each end. A proof mass 2 is located within the sleeve, and coupled to the sleeve via flattened members 12, which are held by end cap bodies 18. The sleeve is provided with a protrusion 26, in the form of a shoulder, which can limit the movement of the proof mass to protect the piezoelectric element in the event the apparatus is dropped.

Each end cap comprises a cavity 24 into which the flattened member 12 may be displaced. Each cavity further comprises a displacement limiter 25. The purpose of the displacement limiter 25 is to limit the amount by which the flattened member can be distorted by limiting the displacement of the proof mass 2 within the apparatus. This may prevent the flattened member 12 from being damaged. In usual operation of the device, i.e. when sensing seismic signals, the displacement of the proof mass 2 will be insufficient for the flattened member 12 to contact the displacement limiter 25, and therefore the displacement limiter 25 has no adverse effects on the operation of the apparatus. However, should the apparatus be dropped, or otherwise subjected to a large acceleration, the flattened member 12 may be distorted by the displacement of the proof mass 2 by an amount sufficient for the flattened member to contact the displacement limiter 25. The displacement limiter 25 prevents or reduces any further displacement, thereby preventing the flattened member 12 from being damaged by over-distortion. As such, the position of the displacement limiter 25 may be arranged such that the distortion of the flattened member 12 is limited to a predetermined amount based on e.g. the construction of the flattened member 12.

The displacement limiter 25 may be rigid, or may be a flexible member able to absorb a limited amount of impact and thereby reduce the likelihood of damage to the flattened member 12.

In the above the clamping force exerted by the flattened members 12 upon the proof mass 14 has been described as constraining the movement of the proof mass 14, relative to the body, to reciprocation in the first direction 3. In the alternative, or additionally, at least a part of a cross section of the sleeve 1 perpendicular to its long axis may conform to at least a part of a cross section of the proof mass 14 perpendicular to its long axis. The effect of this is to constrain the movement of the proof mass relative to the body to reciprocation in the first direction. For example, the proof mass end pieces 4 may have an outer diameter which closely conforms to the internal diameter of the sleeve 1. Thus, little movement of the proof mass 14 is possible perpendicular to the first direction 3. The sleeve 1 to proof mass 14 conformance is of sufficiently close tolerance to avoid rocking or rotational motion about the centre of gravity of the proof mass 14 assembly.

The abutting surfaces of the proof mass 14 and/or sleeve 1 may be coated with low friction material to enable movement of the proof mass 14 relative to the sleeve.

The proof mass 14 and sleeve 1 may not be cylindrical as described above, and may take any shape. This may, in part, be dependent on the size and shape of the battery 2. For example, a cuboid battery may be used with a correspondingly shaped sleeve 1.

In the above, the proof mass 14 was provided with adjustable elements 4 and 9 to enable the length of the proof mass 14 to be altered. This may be required as the length of e.g. the battery 2 may not be sufficiently standardized. In other embodiments, such length adjustment may be achieved using manufactured spacers of appropriate dimensions, having differing sizes of end piece 4, injection moulded parts, or over length spacers which are machined or milled to correct dimension during manufacture. In further embodiments, it is possible that the end cap assemblies 6 may comprise suitable adjustable elements, to enable the distance between the facing concave surfaces 23 of the flattened members 12 (at each end) to be altered. This may be enabled by providing adjustment elements in the cap, for example by arranging the screws 11 to enable a gap between the sleeve and cap to be adjusted. Equally, the length of the retaining member 5 in the first direction may be adjusted by using one of a plurality of different length retaining members 5 or machining the retaining member 5 to a desired length during manufacture. Overall, suitable length adjustment members may be components of, or attached to, the proof mass and/or the piezoelectric substrate.

In yet further embodiments, adjustment may be provided by altering the length of the sleeve during the manufacturing processes, or by having differing length of sleeve from which a desired length may be selected. Equally, the battery terminals may be manufactured with shape and length suitable for the purpose of pre-tensioning the flattened member 12

In embodiments, to address batteries which are not sufficiently standardised across multiple apparatuses, a relatively small proportion of the overall weight of the proof mass may be provided by a dead weight.

The adjustment screw 9 of the proof mass 14 ensures that the contact between the flattened member 12 and the proof mass is over a small area. In embodiments, this screw may not be present, and a suitable projection may serve the same purpose, i.e. to contact the flattened member over an area which is small relative to the overall area of the surface 23 of the flattened member 12.

In some embodiments, a piezoelectric sensor may not be used, and a magnetic transducer system or capacitive transducer system, or electrostatic transducer system or photo-optical transducer system or otherwise may be used to sense the movement of the proof mass 14.

While the above has been described in terms of an elongated cylinder, other configurations whereby the battery 2 is integral to the proof mass 14 are envisaged. For example, one or more batteries may be held with their long axes parallel to the plane of a sensor, such as an elongated ridged piezoelectric sheet. Alternatively the flattened member 12 could be held sandwiched between two reaction mass batteries, with one above and one below the piezoelectric sensor. This would still provide the weight savings envisaged above.

In some embodiments, the geophone transducer comprises an even number of flattened members 12, arranged evenly at opposite ends of the proof mass 14. Each flattened member 12 may further support one or more piezoelectric elements bonded to the surface or surfaces of the flattened member 12 to form piezoelectric sensors. The sensors may be arranged and wired such that the relative motion of the sleeve 1 and the reaction mass 14, will flex paired flattened members 12 in opposite directions. In this arrangement, relative motion of the proof mass 14 will cause one flattened member 12 to become more convex while the opposite flattened member becomes less convex. In one embodiment where the piezoelectric element is bonded to the outer face 22 of each flattened element 12, then the single motion of the proof mass 14 will cause a positive voltage or current in one sensor and a negative voltage output in the other sensor, and vice versa when the motion of the proof mass 14 is in the opposite direction. When the pairs of sensors are wired in series, observing polarity of the electrical output, the voltage amplitude will be twice as large compared to a single sensor—that is the output of the piezoelectric sensors constructively adds increasing the signal. Similarly, when the pairs are correctly wired in parallel, the current output will be twice as large. This enables construction of a transducer with higher sensitivity for nearly the same cost and size.

This configuration, which may be considered a differential push-pull configuration, also provides a lower noise floor, reduced by approximately the square root of the number of differential piezoelectric elements. This improvement occurs through electrical summation of the signals from the sensors, and partial cancellation of any noise, for example the independent random thermionic self noise generated by each individual transducer. This configuration, and the differential input of the analogue electronics also provides additional attenuation of external common-mode noise sources such as inductively induced power line hum or radio wave interference.

Furthermore, this configuration also provides a reduction in harmonic distortion otherwise caused by each individual sensor exhibiting a degree of non-linear transform characteristics. For instance, because the flattened member 12 may have a spring compliance which does not perfectly obey Hooke's law, the response of the flattened member 12 to the movement of the proof mass may be non-linear. For a single sensor this would be observed in the form of even order harmonic distortion components in the output of the sensor, which differ depending on which direction the flattened member 12 is flexed. When the output of one sensor is combined with the second sensor of the pair, at the opposite end of the proof mass 14, and flexing in the opposite sense in relation to the orientation of the piezoelectric material, the distortion components will also be of opposite polarity and the even order harmonics are subsequently suppressed when the output is summed by the differential input of the electronics.

Whilst the proof mass 14 and body have been described as being attached, it will be recognised that this may indicate both physical attachment—for example via the clamping force provided by the flattened member 12—as well as a magnetic or electrical attachment. In other words, in embodiments, the proof mass 14 may be suspended within the body of the apparatus via a magnetic or electrical field, without being in physical contact with any part of the body.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, the apparatus may be designed to be disposable or may be re-usable. The apparatus described are suitable for use in both land and marine seismic acquisition activities. The features of the claims may be combined in combinations other than those specified in the claims.

What is claimed is:

1. A seismic survey apparatus for detecting seismic waves passing through a subterranean formation, the seismic survey apparatus comprising:
    a body having a longitudinal axis, a first end, a second end opposite the first end, and an inner cavity positioned between the first end and the second end;
    a proof mass moveably disposed in the inner cavity of the body, wherein the proof mass is configured to move axially relative to the body;
    a first sensor disposed in the inner cavity, wherein the first sensor comprises a first piezoelectric element configured to detect the axial movement of the proof mass relative to the body;
    electronic circuitry coupled to the first piezoelectric element, wherein the electronic circuitry is configured to receive and process an output of the first piezoelectric element; and
    wherein the proof mass comprises a power supply configured to provide electrical power to the electronic circuitry.

2. The apparatus of claim 1, wherein the power supply comprises a battery.

3. The apparatus of claim 1, further comprising:
    a second sensor disposed in the inner cavity, wherein the second sensor comprises a second piezoelectric element;
    wherein the first piezoelectric element and the second piezoelectric element are disposed on opposite sides of the proof mass and are configured to detect axial movement of the proof mass relative to the body.

4. The apparatus of claim 1, wherein the first piezoelectric element comprises rigid ceramic.

5. The apparatus of claim 1, wherein the first piezoelectric element(s) is pre-stressed.

6. The apparatus of claim 1, wherein the body is configured to constrain the movement of the proof mass relative to the body to axial reciprocation, and wherein the first sensor is configured to detect the axial reciprocation of the proof mass to detect movement of the proof mass relative to the body.

7. The apparatus of claim 1, wherein the proof mass comprises an elongated member having a longitudinal axis, wherein the body comprises an elongated sleeve and an end cap assembly removably coupled to the elongated sleeve, and wherein the longitudinal axis of the elongated member is located co-axially with the longitudinal axis of the body.

8. The apparatus of claim 7, wherein the body is configured to constrain the movement of the proof mass relative to the body to axial reciprocation, and wherein the first sensor is configured to detect the axial reciprocation of the proof mass to detect movement of the proof mass relative to the body.

9. The apparatus of claim 1, wherein the body is configured to be coupled to the ground above the subterranean formation with the longitudinal axis in a vertical orientation and the first end positioned vertically below the second end;
    wherein the proof mass is configured to move vertically within the inner cavity relative to the body.

10. The apparatus of claim 9, wherein the proof mass has a height measured parallel to the longitudinal axis and a diameter measured perpendicular to the longitudinal axis, wherein the ratio of the height to the diameter is between 2:1 and 5:1.

11. The apparatus of claim 7, wherein the elongated member comprises adjustable elements configured to adjust an axial length of the elongated member.

12. The apparatus of claim 5, wherein the proof mass comprises an elongated member;
    wherein the body comprises an elongated sleeve, a first end cap assembly coupled to a first end of the elongated sleeve, and a second end cap assembly coupled to a second end of the elongated sleeve, wherein the first end cap assembly and the second end cap assembly are configured to retain the elongated member within the elongated sleeve, and wherein the first end cap assembly comprises the first sensor.

13. The apparatus of claim 12, wherein each cap assembly comprises a concave surface engaging the elongated member.

14. The apparatus of claim 13, wherein the concave surfaces are configured to exert an axially compressive load upon the elongated member to constrain the movement of the elongated member relative to the body to axial reciprocation.

15. The apparatus of claim 13, wherein each cap assembly comprises:
    a flattened member having a first side surface configured to contact the elongated member; and
    a retaining member configured to exert a clamping force on a perimeter of a second side surface of the flattened member, wherein the second side surface is axially opposite the first side surface.

16. The apparatus of claim 15, wherein one of the flattened members comprises the first sensor.

17. The apparatus of claim 1, wherein at least 75% of the proof mass by weight or by volume is provided by the power supply.

18. The apparatus of claim 1, wherein the body is provided with a protrusion to engage the proof mass so as to limit movement of the proof mass.

19. The apparatus of claim 1, further comprising a first flattened member disposed in the inner cavity and axially positioned between the proof mass and the second end of the body, wherein the first flattened member is configured to flex in response to axial movement of the proof mass relative to the body, and wherein the first piezoelectric element is configured to deflect in response to flexing of the first flattened member and detect the axial movement of the proof mass relative to the body.

20. The apparatus of claim 19, further comprising a second flattened member disposed in the inner cavity and axially positioned between the proof mass and the upper end of the body, wherein the second flattened member is configured to flex in response to axial movement of the proof mass relative to the body.

21. The apparatus of claim 20, wherein the first flattened member axially biases the proof mass toward the second flattened member, and the second flattened member axially biases the proof mass toward the first flattened member.

22. The apparatus of claim 1, wherein the proof mass has a height measured parallel to the longitudinal axis and a diameter measured perpendicular to the longitudinal axis, wherein the ratio of the height to the diameter is between 2:1 and 5:1.

23. A method for detecting seismic waves passing through a subterranean formation, the method comprising:
(a) placing a seismic survey apparatus in contact with the ground above the subterranean formation, wherein the seismic survey apparatus comprises:
an outer housing having a longitudinal axis, a first end, a second end opposite the first end, and an inner cavity;
a proof mass moveably disposed in the inner cavity of the outer housing, wherein the proof mass comprises a power supply;
a first flattened member disposed in the inner cavity and axially positioned between the proof mass and the lower end of the body;
a piezoelectric element disposed in the inner cavity and coupled to the first flattened member;

(b) orienting the seismic survey apparatus with the longitudinal axis of the housing in a vertical orientation and the second end of the outer housing vertically below the first end of the outer housing;
(c) moving the proof mass vertically downward relative to the body in response to seismic waves;
(d) flexing a center of the first flattened member axially toward the second end relative to an outer periphery of the first flattened member in response to (c);
(e) deflecting the piezoelectric element during (d);
(f) generating a signal indicative of the vertical movement of the proof mass during (c) with the piezoelectric element in response to (e).

24. The method of claim 23, further comprising:
(g) biasing the proof mass axially toward the first end relative to the body with the first flattened member after (d).

25. The method of claim 23, wherein the seismic survey apparatus includes a second flattened member disposed in the inner cavity and axially positioned between the proof mass and the upper end of the body.

26. The method of claim 25, further comprising:
(g) moving the proof mass vertically upward relative to the body in response to seismic waves;
(h) biasing the proof mass axially toward the second end relative to the body with the second flattened member after (g).

27. The method of claim 23, wherein at least 75% of the proof mass by weight or by volume is provided by the power supply.

28. The apparatus of claim 25, further comprising constraining the movement of the proof mass relative to the body in the vertical direction.

29. The method of claim 23, further comprising:
powering electronic circuitry coupled to the piezoelectric element with the power supply; and
receiving and processing an output of the piezoelectric element with the electronic circuitry.

30. The method of claim 23, wherein (a) comprises positioning the seismic survey apparatus in the surface of the earth.

* * * * *